(No Model.)
A. H. BARENDT & C. W. CARTER.
PISTON PACKING.
No. 307,831. Patented Nov. 11, 1884.
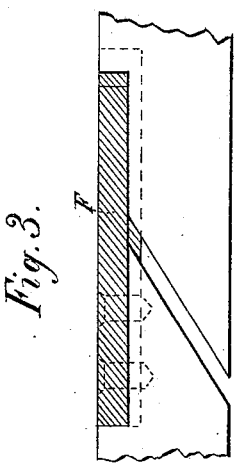
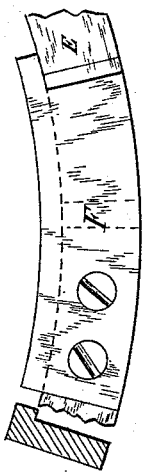
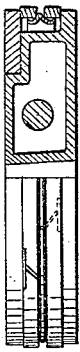
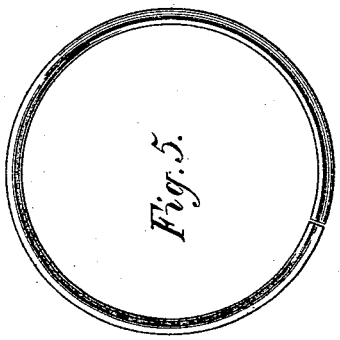
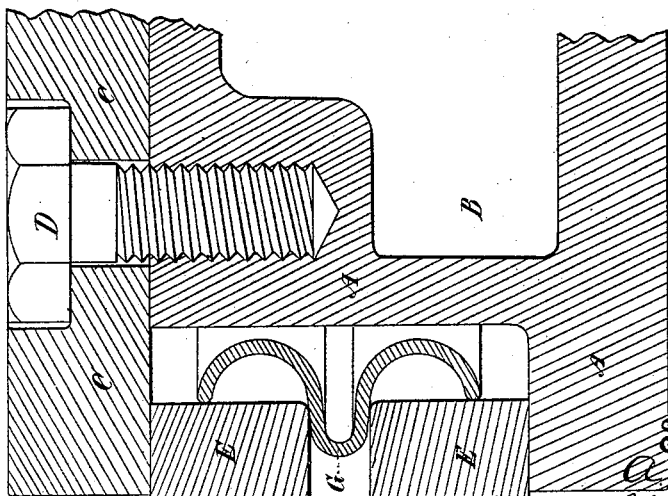
Witnesses:
Geo. H. Strong
J. H. Howse
Inventors,
A. H. Barendt
Chas. W. Carter
By Dewey & Co.
Attorneys

United States Patent Office.

ARTHUR H. BARENDT AND CHARLES WILLIAM CARTER, OF SAN FRANCISCO, CALIFORNIA.

PISTON-PACKING.

SPECIFICATION forming part of Letters Patent No. 307,831, dated November 11, 1884.

Application filed May 12, 1884. (No model.)

*To all whom it may concern:*

Be it known that we, ARTHUR H. BARENDT and CHAS. W. CARTER, of the city of San Francisco, county of San Francisco, and State of California, have invented an Improvement in Piston-Packing; and we hereby declare the following to be a full, clear, and exact description thereof.

Our invention relates to packing for reciprocating pistons.

It consists of rings fitted into the piston-head, and, in connection therewith, of a peculiar spring, whereby the edges of the rings are held in close contact with the faces of the head and follower, so as to prevent the leakage of steam into and through the space beneath the rings and from one end of the cylinder to the other.

Referring to the accompanying drawings for a more complete explanation of our invention, Figure 1 is a view showing a section of one side of the piston with the rings and spring in place. Fig. 2 is an edge view showing part of the piston in section. Fig. 3 is an enlarged edge view of one of the rings, showing the joint. Fig. 4 is a side view of the same. Fig. 5 is a view of the spring.

A is the disk of the piston, with the usual web, B, and C is the follower, which is secured by bolts D.

E E are packing-rings, which may be made of cast-iron in the usual manner, cut diagonally at one side, so as to allow them to expand slightly and fill the cylinder.

F is a plate fitted upon the side of the ring, and it extends over the joint or slit, so as to prevent leakage of steam through it. In the present case we have shown two rings E. Within and between them is a steel ring, G, which is formed of a V or U section, as shown in Fig. 1. The central portion of this ring projects between the rings, and acts to hold them in contact with the front disk and follower of the piston.

In putting the rings in place, the follower being removed from the piston, one of them is put in against the head A. The spring is then slipped into place, occupying a position about midway between the disk A and the follower when the latter is in place. The second ring, E, is then slipped into place, and the follower C is put on and drawn tight against the edge of the last ring by bolts D. This action compresses the central portion of the ring G between the inner edges of the packing-rings E, and its elasticity causes it to exert constant pressure against these rings, forcing them outward and sidewise, so that their outer edges press against disk A and the follower C in such a manner as to form a perfectly-tight joint at these points, and thus prevent all leakage of steam to or through the space within the rings. In the present case we have shown this elastic ring G as formed with the outer edges curved upward, so that the centers of the packing-rings E rest on these edges. It will be seen that the action of this ring will be to assist to hold the rings E in contact with the interior of the cylinder by its own elastic expansibility, while the pressure upon the side of the ring causes it to act with the elastic force against the rings E, as before described. The joint-plates F prevent any escape of steam through the slots or cuts at points where the rings are divided.

Having thus described our invention, what we claim as new, and desire to secure by Letters Patent, is—

In combination with the split rings E, the curved elastic ring G, having a central portion projecting between the rings E to hold them in contact with the front disk, substantially as described.

In witness whereof we have hereunto set our hands.

ARTHUR H. BARENDT.
CHARLES WILLIAM CARTER.

Witnesses:
S. H. NOURSE,
C. D. COLE.